(12) United States Patent
Koo

(10) Patent No.: US 8,827,444 B1
(45) Date of Patent: Sep. 9, 2014

(54) SCREW-FREE CONNECTION STRUCTURE FOR A FRAME AND TEMPLES OF EYEGLASSES

(71) Applicant: Wing-Cheong Koo, Kowloon (HK)

(72) Inventor: Wing-Cheong Koo, Kowloon (HK)

( * ) Notice: Subject to any disclaimer, the term of this patent is extended or adjusted under 35 U.S.C. 154(b) by 60 days.

(21) Appl. No.: 13/667,383

(22) Filed: Nov. 2, 2012

(51) Int. Cl.
*G02C 5/14* (2006.01)
*G02C 5/16* (2006.01)

(52) U.S. Cl.
USPC .......................... 351/121; 351/111; 351/113

(58) Field of Classification Search
CPC .................................................. G02C 2200/22
USPC ....................................................... 351/121
See application file for complete search history.

(56) References Cited

U.S. PATENT DOCUMENTS

| | | | | |
|---|---|---|---|---|
| 3,155,982 A | * | 11/1964 | Baratelli | 2/12 |
| 7,121,663 B1 | * | 10/2006 | Huang | 351/153 |
| 7,344,242 B2 | * | 3/2008 | Habermann | 351/156 |
| 7,484,844 B2 | * | 2/2009 | Spandl | 351/153 |
| 7,543,931 B2 | * | 6/2009 | Proksch | 351/113 |
| 8,042,939 B2 | * | 10/2011 | Le Duy | 351/153 |
| 8,414,120 B2 | * | 4/2013 | Cheong | 351/158 |
| 2013/0044288 A1 | * | 2/2013 | Cheng | 351/121 |
| 2013/0229613 A1 | * | 9/2013 | Carpenter et al. | 351/113 |

* cited by examiner

*Primary Examiner* — Thomas K Pham
*Assistant Examiner* — Nicholas Pasko
(74) *Attorney, Agent, or Firm* — Pro-Techtor Int'l Services

(57) ABSTRACT

The present invention discloses a screw-free connection structure for a frame and temples of eyeglasses. The eyeglasses are assembled primarily by a frame, two connection blocks, two elastic elements and two temples, wherein two temples are connected with a left and right end of the frame by the connection blocks, so that the temples and the frame can be connected together rapidly and securely without locking with screws.

2 Claims, 3 Drawing Sheets

SCREW-FREE CONNECTION STRUCTURE FOR A FRAME AND TEMPLES OF EYEGLASSES

BACKGROUND OF THE INVENTION a) Field of the Invention

The present invention relates to a screw-free connection structure for a frame and temples of eyeglasses, and more particularly to a pair of eyeglasses that are assembled without using screws.

b) Description of the Prior Art

For most of eyeglasses, each side of lenses is installed with a temple respectively. To facilitate containing or carrying, the temples are collected inward with screws of pivot collection as pivot points. However, regularly folding the temples will allow the screws to get loose that the frame and the temples cannot be connected together securely.

SUMMARY OF THE INVENTION

Accordingly, the primary object of present invention is to improve the shortcomings of the conventional eyeglasses that use the screws as connection elements, by using screw-free parts to connect the frame and the temples, so that the frame and the temples can be combined securely.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
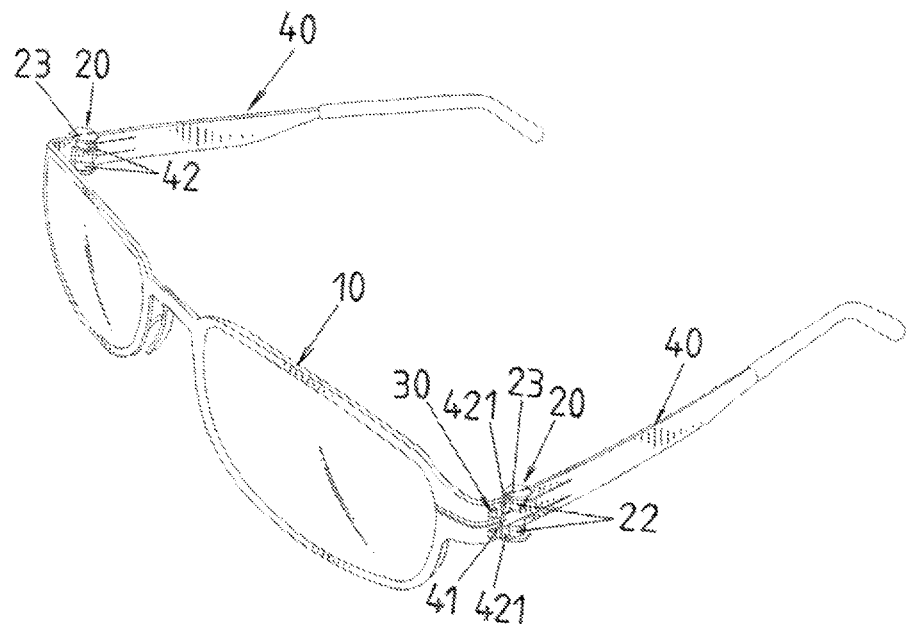
FIG. 1 shows a schematic view of the present invention.
Figure 2:
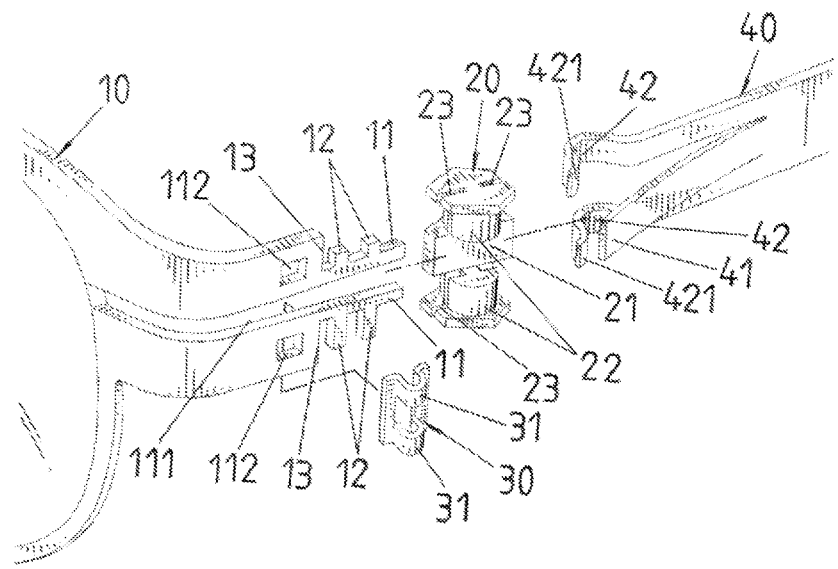
FIG. 2 shows a partially exploded view of the present invention.
Figure 3:
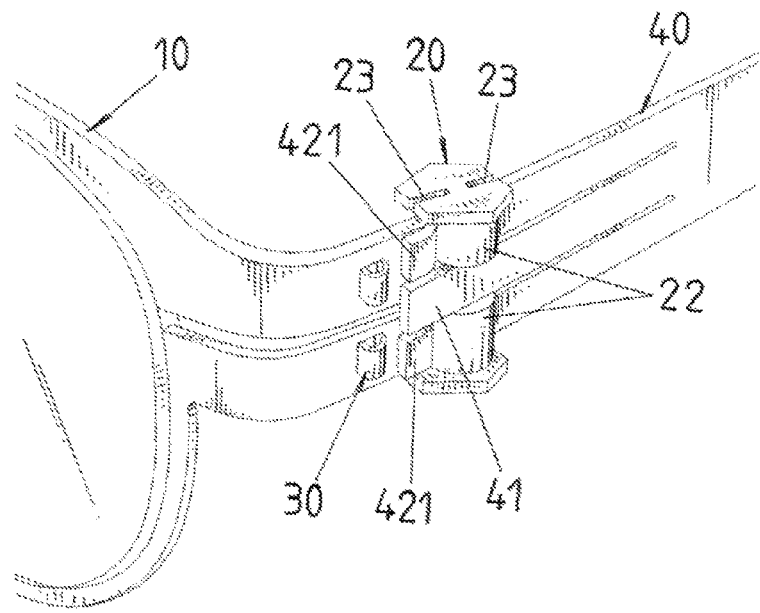
FIG. 3 shows a partially enlarged structural drawing of FIG. 1.

With reference to FIGS. 1 to 6, the present invention comprises a frame 10, two connection blocks 20, two elastic elements 30 and two temples 40, wherein a transversal open slot 111 is provided respectively between connection ends 11 at a left and right end of the frame 10, and an opening at a front edge of the open slot 111 is provided respectively with two latch pins 12 that face oppositely to each other, allowing a front side of the connection end 11 to form a concavo-convex structure design. An upper and lower end of the two connection end 11 are provided respectively with a latch hole 112 for locking with the elastic element 30 and an inner side of each connection end 11 is provided with a wall 13.

The aforementioned connection block 20 is provided with an I-shaped cross section, and is able to combine the frame 10 with the temples 40 as one unit. A latch slot 21 provides for latching the two connection ends 11 that are closed together. Two sides of two T-shaped cylinders 22 at an upper and lower end of the latch slot 21 are provided respectively with a longitudinal locking slot 23 and interiors of the left and right locking slot 23 are able to provide for locking into two latch pins 12 of the connection ends 11 to be positioned (the upper structure is the same as the lower structure). The elastic element 30 is in an "Ω" shape when being viewed from top, and above the elastic element 30 is provided with two elastic blocks 31 that can be latched into the two latch holes 112 of the connection ends 11 for positioning respectively, so that the four latch pins 12 of the connection ends 11 can be stably latched into the four locking slots 23 of the connection blocks 20 for positioning.

A front end of each temple 40 is in a shape of three forks and in a middle of the temple 40 is a straight elastic leaf 41. An upper and lower end of the temple 40 is an arc-shaped hook element 42, a front edge of the hook element 42 is provided with a baffle plate 421, and the hook elements 42 of the temples 40 are hooked on two cylinders 22 of the connection blocks 20, respectively. The elastic leaf 41 is transfixed into the latch slot 21 and is abutted at the connection end 11 of the frame 10. Two baffle plates 421 of the temples 40 are put against on the walls 13 of the connection ends 11 of the frame 10.

Figure 4:
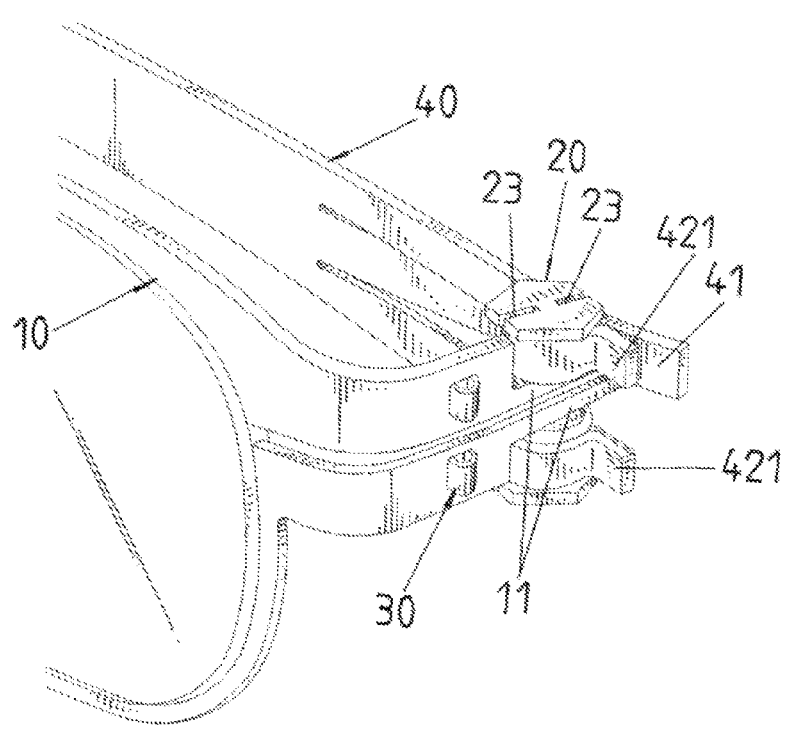
FIG. 4 shows a partial structural drawing when temples of the present invention are folded.
Figure 5:
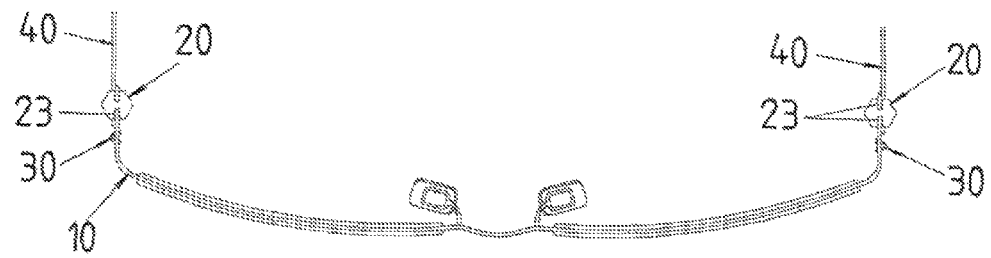
FIG. 5 shows a top view of the present invention.
Figure 6:
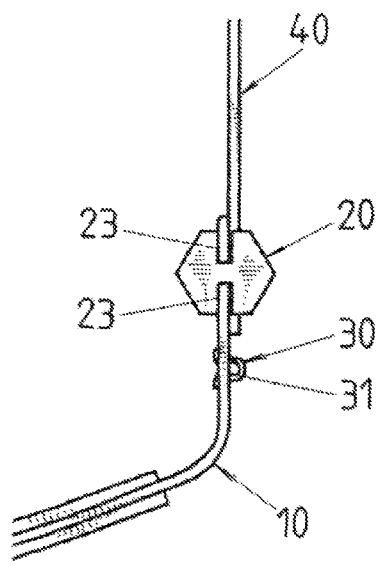
FIG. 6 shows a partially enlarged structural drawing of FIG. 5.

With reference to FIG. 4, to facilitate containing or carrying the eyeglasses, two temples 40 can be folded toward a center of the frame 10, wherein two hook elements 42 of the temples 40 are turned against the cylinders 22 of the connection blocks 20. At this time, two connection ends 11 of the frame 10 put against and extend outward the elastic leaves 42 of the temples 40, allowing the temples 40 to be in a folded state. If the temples 40 are to be restored to a normal state as in FIG. 1, a user only need to bend outward the temples 40 and then an elastic force of the elastic leaf 41 can bounce back two temples 40 instantaneously. Next, two hook elements 42 of the temples 40 are turned against the cylinders 22 of the connection blocks 20, restoring two temples 40 to their original positions.

Conclusively, in the present invention, the structure design of the connection ends between the frame and the temples is utilized, in association with the simple parts such as the connection blocks and the elastic elements, to securely assemble the frame with the temples, without the trouble that results from locking with the screws.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A screw-free connecting structure of a frame and temples of eyeglasses, comprising:

a frame, with an open slot being provided respectively between a connection ends at a left and right end of the frame, an opening at a front edge of the connection end being provided respectively with two latch pins that face oppositely to each other, an upper and lower end of two connection ends of the open slots being provided respectively with a latch hole and an inner side of each connection end being provided respectively with a wall and wherein the connection ends are linear when viewed from above;

two connection blocks, a middle of the connection block being provided with a latch slot to latch into the connection ends that are closed together, two sides of two T-shaped cylinders at an upper and lower end of the latch slot being provided respectively with a locking slot that provides for locking into the latch pins of the frame for positioning;

two elastic elements, being provided with two elastic blocks that are latched into two latch holes of the connection ends of the frame for positioning; and two temples, a front end of each temple is in a shape of three forks, in a middle of the temple being provided with an elastic leaf, an upper and lower end of the temple being provided respectively with an arc-shaped hook element, the hook element being hooked at two cylinders above and below the connection block, and a front edge of the hook element being provided with a baffle plate that is put against on the wall of the connection end of the frame.

2. The screw-free connecting structure of a frame and temples of eyeglasses, according to claim 1, wherein the elastic element is in an "Ω" shape when being viewed from top.

* * * * *